*United States Patent Office*

3,748,104
Patented July 24, 1973

3,748,104
EXTRACTION OF TRANSPLUTONIUM ELEMENTS FROM AN AQUEOUS SOLUTION CONTAINING RARE EARTHS AND FISSION PRODUCTS
Gerard Koehly, Maisons-Alport, France, assignor to Commissariat a l'Energie Atomique, Paris, France
Filed Mar. 21, 1969, Ser. No. 809,433
Claims priority, application France, Mar. 29, 1968, 146,356
Int. Cl. B01d *11/00*
U.S. Cl. 423—10
2 Claims

ABSTRACT OF THE DISCLOSURE

A method of treatment of aqueous solutions containing transplutonium elements, rare earths and fission products and more precisely a method of removal of fission products from these solutions, characterized in that the acid concentration of said solutions is adjusted to a normality which is higher than 1 N and that said solutions are contacted with an organic phase consisting of an organophosphorus acid diluted in a solvent which is immiscible with water, the fission products being extracted by said organic phase.

---

The preparation of the transplutonium actinide elements which are obtained by irradiation either of transplutonium elements having a lower atomic number or of fertile or fissile nuclear material makes it necessary to separate said transplutonium or actinide elements from any nuclear materials which may have served for their production and to remove the fission products which always accompany their formation.

Thus, during the preparation of these actinides, there is found to be present an aqueous solution containing in addition to these elements rare earths and other fission products (Ru, Mo, Zr and so forth).

At the present time, the treatment of these aqueous solutions (formed actinides, lanthanides and fission products) with a view to recovery of all the actinides is carried out:

(a) By extraction of the actinides and lanthanides by means of a solvent (tributylphosphate, for example) followed by stripping of said actinides by means of an acid aqueous solution and accompanied by an extraction of lanthanides by virtue of an organophosphorus acid (diethylhexylphosphoric acid, for example) in a complexing medium (such as diethylenetriaminopentaacetic acid) and carboxylic acid (lactic acid). The actinides are then present in aqueous phase and must be purified by means of a solvent. This purification consists of extraction of the actinides by an organophosphorus acid and stripping of these latter in a complexing aqueous medium (diethylenetriaminopentaacetic acid) and carboxylic acid (lactic acid).

Although this process proves satisfactory insofar as concerns the purity of the product obtained, it does nevertheless suffer from the major disadvantage of requiring five processing steps.

(b) By extraction of the actinides and lanthanides by means of a solvent (tributylphosphate, trilaurylamine, trioctylphosphine) followed by stripping of the actinides by means of an aqueous solution of lithium nitrate to which is added a polyaminoacetic complexant (such as diethylenetriaminopentaacetic acid, for example). The actinides are present in the aqueous phase directly in two steps and can be separated.

While this second process appears to be the more attractive of the two since it eliminates three steps of the treatment described earlier, it has the disadvantage in the case of separation of similar chemical elements (Am-Eu for example) of producing separation factors which are lower than in the first method described. Thus, in the pair americium-europium, the α-emitter americium is contaminated by the β- and γ-emitter europium. The improvement of this separation factor appears to be due to the use of organophosphorus acid as solvent.

The present invention is directed to a method of treatment of aqueous solutions containing transplutonium elements, lanthanides and other fission products—and more precisely a method of removal of unwanted fission products from such solutions—which makes it possible to reduce the number of processing steps while making use of an organophosphorus acid.

The method according to the invention is characterized in that the acidity of the aqueous solutions containing transplutonium elements, rare earths and fission products is adjusted to a normality which is higher than 1 N and that said solutions are contacted with an organic phase consisting of an organophosphorus acid diluted in a solvent which is immiscible with water, the fission products being extracted by said organic phase.

Among the organophosphorus acids which are suitable for the application of this invention, mention can be made of the derivatives of phosphoric and phosphonic acids, the dialkylphosphoric acids such as diethylhexylphosphoric acid, dibutylphosphoric acid, the monoalkylphosphoric acids such as monoethylhexylphosphoric acid, mono[(p-1,1,3,3-tetramethyl-butyl)phenyl]phosphoric acid, the dialkylhexyl - phosphonic acids such as di-n-octyl-phosphonic acid and di-[ethyl-hexyl]-phosphonic acid.

The organophosphorus acids are diluted in an inert solvent which is immiscible with water such as dodecane, toluene, kerosene. The concentration of the acid in the solvent is usually between 0.05 M and 0.5 M.

The acidity of the aqueous solutions containing transplutonium elements, rare earths and fission products is adjusted to a normality which is higher than 1 N. Nitric acid is preferably employed but it is apparent that other mineral acids could be employed. The upper limit of normality is related to the dangers of degradation of the solvent and to the formation of complexes of certain elements. This limit is of the order of 8 N.

The organophosphorus acids in an acid medium which is higher than 1 N carry away the fission products (Ru, Mo, Zr, etc.) and leave in the aqueous phase the transplutonium elements and the lanthanides. After separation of the organic phase containing the fission products, this aqueous phase can in turn be treated by any known means.

It is possible, for example, to treat the aqueous phase with an organophosphorus acid (such as diethylhexylphosphoric acid, for example) having a different acid strength so that the transplutonium elements and the lanthanides pass into the solvent phase and to strip the actinides by means of a complexing aqueous solution (such as diethylenetriaminopentaacetic acid). By virtue of the method in accordance with the invention, it is thus possible in three steps to make use of the organophosphorus acids which are excellent solvents.

It is also possible to treat this aqueous phase which is freed of fission products with a molecule-exchange solvent (tributylphosphate, trilaurylamine, trioctylphosphine oxide), to extract the actinides and the lanthanides into the solvent phase and to strip the actinides by means of an aqueous solution of lithium nitrate to which is added a polyaminoacetic complexant.

There will be described below three examples which are given without any limitation and which relate to the application of a method of treatment of irradiated materials as contemplated by the present invention. The practical arrangements which will be described in connection with these examples must be considered as forming part of the invention, it being understood that any equivalent arrangements could equally well be adopted without thereby departing from the scope of this invention.

EXAMPLE 1

Two hundred grams of a Pu-Al alloy containing 10% Pu which were irradiated in a nuclear reactor (integrated flux=$4\times10^{21}$ neutrons) yielded 150 mg. of americium and 15 mg. of curium.

After dissolution of the alloy with nitric acid, the plutonium (2.6 g.) was recovered by means of trilaurylamine. The effluent nitric acid solution (americium, curium, lanthanides, fission products) received an addition of aluminum nitrate in order to obtain a concentration of $Al^{+++}$ equal to 1 M and was adjusted to a nitric acid concentration equal to 1 N prior to being treated in accordance with the invention for a period of two hours with one-third of its volume of 0.25 M diethylhexylphosphoric acid in dodecane. The aqueous phase which was freed of fission products received an addition of 4 M lithium nitrate and was adjusted to a pH value of 1.5, then treated in a six-stage bank of mixer-settlers with a 0.25 M solution of diethylhexylphosphoric acid in dodecane. The transplutonium elements and the lanthanide elements then passed into the organic phase and were subjected to purification. The transplutonium elements were then removed from said organic phase by means of an aqueous solution containing 3 M lithium nitrate and 0.65 M diethylenetriaminopentaacetic acid. Americium and curium were recovered with a yield of 98% and were of high purity.

The decontamination factors ($\alpha$ and $\beta$) both total and relative to given elements appear in the following table:

| | |
|---|---|
| $\beta$ | 560 |
| $\alpha$ | 730 |
| Cs | >3000 |
| Ru | >3500 |
| Sb | 3000 |
| Eu | 600 |
| Ce | 600 |

It can be mentioned by way of indication that these decontamination factors which are achieved in three steps are identical with those obtained by means of the first method in five steps which is referred to in the description. Moreover, the treatment with a molecule-exchanger solvent and stripping with an acid solution of lithium nitrate to which a polyaminoacetic complexant is added achieves a decontamination factor Am/Eu of only 50.

EXAMPLE 2

100 mg. of americium-241 irradiated with an integrated flux of $6\times10^{19}$ neutrons yielded 6 mg. of curium.

After dissolution with nitric acid, the plutonium was recovered by means of trilaurylamine. The effluent nitric acid solution (americium, curium, lanthanides, fission products) received an addition of aluminum nitrate in order to obtain a concentration of $Al^{+++}$ equal to 1 M and was adjusted with a nitric acid concentration equal to 2 N prior to being treated in accordance with the invention for a period of one hour with one half of its volume of 0.25 M diethylhexylphosphoric acid in dodecane. The aqueous phase which was freed of fission products received an addition of 4 M lithium nitrate and was adjusted to a pH value of 1.5, then treated in a six-stage bank of mixer-settlers with a solution of 0.25 M diethylphosphoric acid in dodecane. The transplutonium elements and the lanthanides then passed into the organic phase and were subjected to purification. The transplutonium elements and the lanthanides were then removed from this organic phase by means of an aqueous solution containing 3 M lithium nitrate and 0.065 M diethylenetriaminopentaacetic acid. The americium and curium were recovered with a yield of 98% and were of high purity.

EXAMPLE 3

The effluent solution initially employed was derived from a plant for reprocessing irradiated fuels containing fission products, lanthanides and a small quantity of americium-241. Aluminum nitrate was added to this solution in order to obtain a 0.7 M concentration of $Al^{+++}$. The nitric acid concentration of the solution was then adjusted to 3 N prior to treatment in accordance with the invention for a period of one hour with an equal volume of 0.2 M diethylhexylphosphoric acid in dodecane. The aqueous phase which was freed of fission products received an addition of 4 M lithium nitrate and was adjusted to a pH of 1, then treated in a six-stage mixer-settler bank with a solution of 0.2 M diethylhexylphosphoric acid in dodecane. The transplutonium elements and the lanthanides then passed into the organic phase and were thus subjected to purification. The transplutonium elements were then removed from said organic phase by means of an aqueous solution containing 3 M lithium nitrate and 0.065 M diethylenetriaminopentaacetic acid. The americium and curium were recovered with a yield of 98% and were of high purity.

What we claim is:

1. A process for extracting transplutonium elements from an aqueous solution containing transplutonium elements, rare earths and fission products, comprising adjusting the acidity of said aqueous solution to a normality at least equal to 1 N, contacting said solution with an organic phase consisting of an organo-phosphoric acid diluted in a solvent immiscible in water, said fission products being thereby extracted into said organic phase; separating said organic phase from the remaining aqueous phase, adding lithium nitrate to said remaining aqueous phase, mixing an organo-phosphoric acid therewith in such a manner that the transplutonium elements and the lanthanides pass into the resulting organic phase, and re-extracting the transplutonium elements from said organic phase using an aqueous solution containing lithium nitrate and a polyaminoacetic complex.

2. The method of claim 1, wherein said transplutonium elements are selected from the group consisting essentially of americium and curium.

References Cited

UNITED STATES PATENTS

| | | | |
|---|---|---|---|
| 2,848,300 | 8/1958 | Warf | 23—341 |
| 2,898,186 | 8/1959 | Hopkins | 23—342 |
| 3,463,619 | 8/1969 | Ritter et al. | 23—343 X |

CARL D. QUARFORTH, Primary Examiner

P. A. NELSON, Assistant Examiner

U.S. Cl. X.R.

23—342, 343; 252—301.1 R